United States Patent [19]
Yamamoto

[11] Patent Number: 5,529,106
[45] Date of Patent: Jun. 25, 1996

[54] PNEUMATIC TIRES WITH CLOSED PACKED MONO STRAND BEAD CORE STRUCTURE

[75] Inventor: Masahiko Yamamoto, Tokyo, Japan

[73] Assignee: Bridgestone Corporation, Tokyo, Japan

[21] Appl. No.: 346,272

[22] Filed: Nov. 22, 1994

[30] Foreign Application Priority Data

Nov. 30, 1993 [JP] Japan ................................ 5-323417
May 31, 1994 [JP] Japan ................................ 6-139594

[51] Int. Cl.$^6$ .......................... B60C 15/00; B60C 15/04
[52] U.S. Cl. ...................... 152/540; 152/547; 245/1.5
[58] Field of Search .................................. 152/539, 540, 152/547; 245/1.5; 156/136

[56] References Cited

U.S. PATENT DOCUMENTS 5,099,892  3/1992  Siegenhaler.
5,099,893  3/1992  Giorgetti.

OTHER PUBLICATIONS

Patent Abstracts of Japan, No. 166 (M–1065) Corresponding to Japanese Laid-Open Patent Application No. HEI: 2-256503, Oct. 17, 1990.

Patent Abstracts of Japan, No. 120 (M–1079) corresponding to Japanese Laid-Open Patent Application No. HEI: 2-286407, Nov. 26, 1990.

*Mechanics of Pneumatic Tires*, ed. Samuel Clark: U.S. Dept. of Transportation, Aug. 1981, pp. 209–211.

Primary Examiner—Adrienne C. Johnstone
Attorney, Agent, or Firm—Sughrue, Mion, Zinn, Macpeak & Seas

[57] ABSTRACT

A pneumatic tire for small passenger vehicles having a pair of bead portions located at the internal periphery of a pair of sidewalls connected to a tread at both its edges, wherein the bead core of the bead portion is a mono strand bead core and the cross-section of the bead core is a close-packed structure unit made of 3 to 20 wire windings. The diameter D of the wire is 1.2 to 1.8 mm, and the ratio H/D of the distance H between the centers of adjacent wire windings to the diameter D of the wire is 1.01 to 1.20. The cross-sectional configuration of the bead core is such that N2=N1+1, where N1 is the wire number of the first row and N2 is the wire number of the second row counted from the bead base side. It is possible to improve steering characteristics (maneuverability) of such a pneumatic tire for small passenger vehicles by restraining the disorder of uniformity of the tire in the circumferential and longitudinal directions.

5 Claims, 1 Drawing Sheet

PNEUMATIC TIRES WITH CLOSED PACKED MONO STRAND BEAD CORE STRUCTURE

BACKGROUND OF THE INVENTION

1. Field of the Invention

The present invention relates to pneumatic tires, and in particular to pneumatic tires for small passenger vehicles having good steering characteristics by improving the bead construction of the tire.

2. Description of the Prior Art

The bead core of the bead portion of a pneumatic tire has a function of locating and fixing textile or steel cords of a carcass ply and a function of determining the internal periphery of the tire body and engaging the tire with a wheel rim.

Thus, the bead core is a very important component part in a pneumatic tire, and various kinds of constructions of bead core have been proposed. For example, as shown in FIG. 5 of the accompanying drawings, it is well known to construct a bead core 10 by winding a strip 11 of wire-rubber matrix made of one row of several wires 12 buried in rubber 13. The cross-sectional configuration of such a bead core is shown in FIG. 6.

However, in manufacturing a pneumatic tire having the above-mentioned bead core obtained by winding a strip of wire-rubber matrix or other conventional bead core, the rows and lines of the wire-rubber matrix tend to fall into disorder during tire building and curing, and it is very difficult to maintain uniformity of tires in circumferential and longitudinal directions. Consequently, the steering characteristics (maneuverability) of the tires thus manufactured are adversely affected.

It is an object of the present invention to provide a pneumatic tire for small passenger vehicles having improved steering characteristics (maneuverability) by restraining the disorder of uniformity of tires in the circumferential and longitudinal directions.

SUMMARY OF THE INVENTION

The present invention provides a pneumatic tire, particularly for small passenger vehicles, having a pair of bead portions located at the internal periphery of a pair of sidewalls connected to a tread at both the edges thereof, characterized in that:

(1) the bead core of the bead portion is a mono strand bead core made of rubberized circular-cross-section wire windings spirally wound and bundled, and the cross-section of the bead core is a close-packed structure unit made of 3 to 20 wire windings including a first row, a second row, and a bead base side;

(2) the diameter (D) of the wire is 1.2 to 2.2 mm, and the ratio (H/D) of the distance (H) between the centers of adjacent wire windings to the diameter (D) of the wire is 1.01 to 1.20; and (3) the cross-sectional configuration of the bead core is such that $N2=N1+1$, where $N1$ is the wire number of the first row and $N2$ is the wire number of the second row counted from the bead base side.

It is preferable that the cross-section of the bead core has a regular hexagon including a close-packed structure unit made of 7 wire windings.

The storage modulus (E') at 30° C. of the rubber between the wire windings is preferably not less than $3.0\times10^8$ dyn/cm$^2$, and more preferably not less than $10\times10^9$ dyn/cm$^2$.

In accordance with the present invention, the bead core is a mono strand bead core and comprises a close-packed structure unit, the cross-section of which is made of 3 to 20 wire windings. If the number of windings is less than 3, the close-packed structure unit is not obtained. If the number of wire windings is greater than 20, the weight of the tire is increased and it becomes difficult to assemble the tire on a rim.

Also, in accordance with the present invention, the diameter (D) of the wire windings is 1.2 to 2.2 mm, and the ratio (H/D) of the distance (H) between the centers of adjacent wire windings to the diameter (D) of the windings is 1.01 to 1.20. If the diameter (D) of the wire windings is less than 1.2 ram, the rigidity and strength of the bead core are not sufficient; while if the diameter (D) of the wire windings is more than 2.2 mm, the weight of the tire is increased and it becomes difficult to assemble the tire on a rim. If the above ratio (H/D) is less than 1.01, since the structural rigidity of the bead core ring becomes too high, it becomes difficult to assemble the tire on a rim; while if the ratio (H/D) is more than 1.20, since deformation of the bead core during tire building and curing becomes large, tire uniformity is deteriorated. It is preferable that the diameter (D) of the wire windings is 1.2 to 1.8 mm and the above ratio (H/D) is in the range of 1.05 and 1.15.

Further, in accordance with the present invention, the configuration of the bead core in the cross-section including the tire rotating axis is such that $N2=N1+1$, where $N1$ is the wire number (number of the wire winding) of the first row and $N2$ is the wire number of the second row. This configuration is necessary for reducing moment given to the bead core by the carcass ply during tire building and curing. This configuration makes the deformation of the bead core small and restrains the disorder of uniformity of tires in the circumferential and longitudinal directions, and therefore improves stable steering characteristics (maneuverability).

DESCRIPTION OF THE PREFERRED EMBODIMENTS

Figure 1:
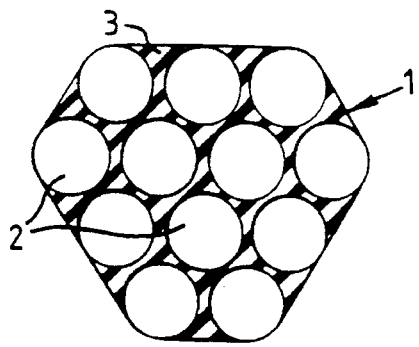
FIG. 1 is a cross-section view showing a bead core configuration in the section including the tire rotating axis.
Figure 2:
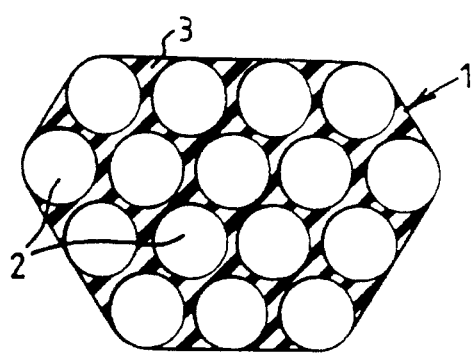
FIG. 2 is a cross-section view showing another bead core configuration in the section including the tire rotating axis.
Figure 3:
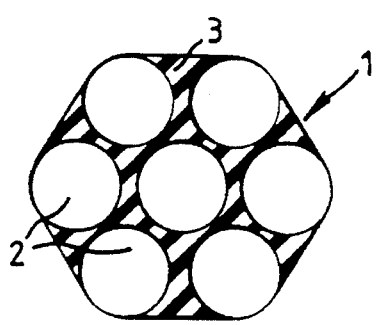
FIG. 3 is a cross-section view showing yet another bead core configuration in the section including the tire rotating axis.

If the cross-section of the bead core has a regular hexagon of close-packed structure made of 7 wire indings, the above-mentioned moment given to the bead core by the carcass ply during tire building and curing is much more reduced and the deformation of the bead core during tire building and curing becomes small. Here, "the cross-section of the bead core having regular hexagon including a close-packed structure unit made of 7 wire windings" means both (1) the cross-section of the bead core 1 shown in FIG. 1 and FIG. 2, where an arbitrary set or group of 7 wire windings 2 constitutes a regular hexagon including a close-packed structure unit and (2) the cross-section of the bead core 1 shown in FIG. 3, where all the wire windings 2 constitute a regular hexagon including a close-packed structure unit. In FIGS. 1, 2 and 3, the wire windings 2 are buried in rubber 3.

To reduce rubber flow and to make the deformation of the bead core during tire building and curing small, it is preferable that the storage modulus (E') at 30° C. of the rubber 3 between the wire windings 2 is not less than $3.0 \times 10^8$ dyn/cm², more preferably not less than $1.0 \times 10^9$ dyn/cm².

In accordance with the invention, since the bead core is constructed as mentioned above, it is possible to use 1bead wire windings having a larger diameter than conventional ones. Thus, the number of windings of a mono strand bead is reduced and bead breaking pressure becomes higher. Consequently, in accordance with the invention, reduction of tire weight and reduction of tire material and manufacturing cost are achieved.

The invention will be further described with reference to the following examples.

Figure 4:
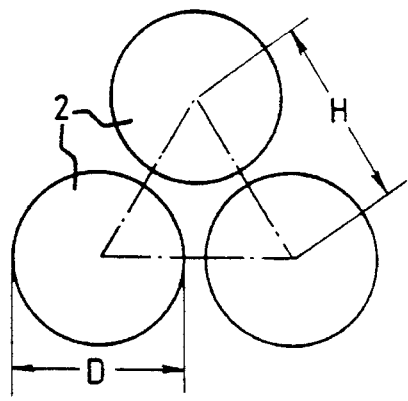
FIG. 4 is an enlarged cross section view of a bead core in accordance with the invention.
Figure 5:
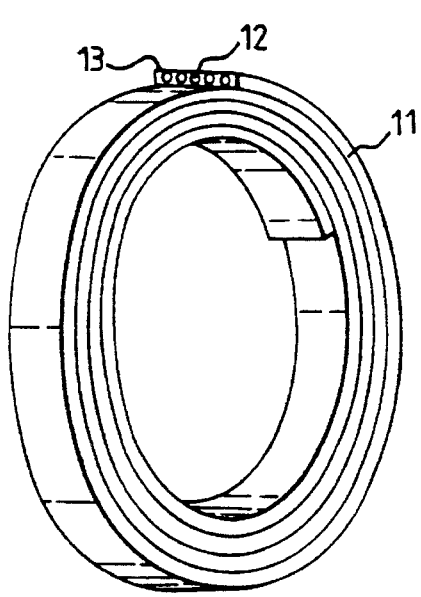
FIG. 5 is a perspective view of a bead core of the prior art.
Figure 6:
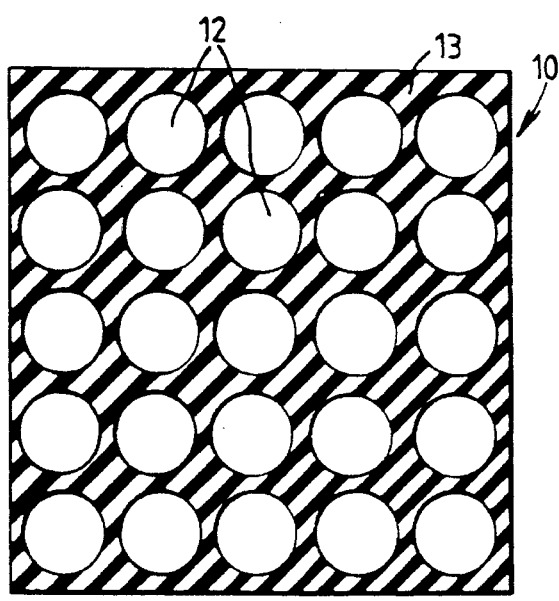
FIG. 6 is a cross-section view of the prior art bead core configuration shown in FIG. 5 in the section including the tire rotating axis.

In the examples, the configurations of the bead core in the cross-section including the tire rotating axis are as shown in FIG. 6 (construction 1. ), as shown in FIG. 1 (construction 2. ), as shown in FIG. 2 (construction 3. ), and as shown in FIG. 3 (construction 4.). Bead cores having various values of wire diameter (D) and ratio (H/D) of the distance (H) between the centers of adjacent wire windings to the diameter (D) of the wire (see FIG. 4), and storage modulus (E') at 30° C. of the rubber between the wire windings as shown in Tables 1 to 3 below were tested in view of time required for rim mounting (hereinafter defined).

Also, steering characteristics (maneuverability) of tires having the above bead cores were evaluated. The tire size was 205/65 R15.

Storage modulus (E'), time required for rim mounting, and steering characteristics (maneuverability) are evaluated as follows.

Storage modulus (E')

Test samples of 5 mm width and 20 mm length are cut out from slab sheet rubber of 2 mm thickness cured under the condition of 160° C.×15 minutes. Storage modulus (E') of each sample is measured by a spectrometer made by Iwamoto Seisakusho K. K. under the condition that initial load is 160 g, dynamic strain is 1%, frequency is 52 Hz, and temperature is 30° C.

Time for Rim Mounting

The average time (t) required for rim mounting is measured after 10 tires of each tire size 155/65 R12, 175/70 R13 and 205/65 R15 are mounted on a rim of 12×4.00B, 5J-13 and 6J-15 respectively. The average time (t) required for rim mounting of a comparison tire of construction 1. is defined to be $t_o$ and used as a control. Index of $(t_o/t) \times 100$ is shown in the Tables for each tire. The higher the index, the better the results. An index of more than 80 is satisfactory.

Steering Characteristics (Maneuverability)

Steering characteristics (maneuverability) are evaluated by feeling by a test driver after driving passenger vehicles on which test tires are mounted. Test results are shown by an index, where index 100 represents the result of the comparison tire.

The results of the evaluation are shown in Tables 1 to 3 below.

TABLE 1

|  | C-1 | E-1 | C-2 | C-3 | E-2 | E-3 | E-4 |
| --- | --- | --- | --- | --- | --- | --- | --- |
| construction No. shown in Figures | 1. | 2. | 2. | 2. | 2. | 2. | 2. |
| wire diameter | 0.96 | 1.40 | 1.40 | 1.40 | 1.40 | 1.40 | 1.40 |
| H/D | 1.30 | 1.14 | 1.008 | 1.23 | 1.03 | 1.18 | 1.14 |
| storage modulus (E') (× 10⁸ dyn/cm²) | 1.8 | 3.3 | 3.3 | 3.3 | 3.3 | 3.3 | 1.8 |
| rim mounting | 100 | 98 | 52 | 118 | 87 | 107 | 105 |
| maneuverability | 100 | 120 | 106 | 98 | 115 | 107 | 101 |

TABLE 2

|  | E-5 | E-6 | C-4 | E-7 | E-8 | C-5 | E-9 |
| --- | --- | --- | --- | --- | --- | --- | --- |
| construction No. shown in Figures | 2. | 2. | 1. | 3. | 3. | 4. | 4. |
| wire diameter | 1.40 | 1.40 | 0.96 | 1.20 | 1.20 | 1.80 | 1.80 |
| H/D | 1.14 | 1.14 | 1.30 | 1.17 | 1.12 | 1.008 | 1.03 |
| storage modulus (E') (× 10⁸ dyn/cm²) | 5.0 | 12 | 5.0 | 5.0 | 5.0 | 3.3 | 3.3 |
| rim mounting | 98 | 97 | 99 | 100 | 99 | 50 | 91 |
| maneuvarability | 123 | 126 | 99 | 114 | 120 | 107 | 110 |

TABLE 3

|  | E-10 | E-11 | C-6 | E-12 | E-13 | E-14 | E-15 |
|---|---|---|---|---|---|---|---|
| construction No. shown in Figures | 4. | 4. | 4. | 4. | 4. | 4. | 4. |
| wire diameter | 1.80 | 1.80 | 1.80 | 1.80 | 1.80 | 1.80 | 1.80 |
| H/D | 1.10 | 1.16 | 1.23 | 1.16 | 1.16 | 1.16 | 1.16 |
| storage modulus (E') ($\times 10^8$ dyn/cm$^2$) | 3.3 | 3.3 | 3.3 | 1.8 | 5.0 | 12 | 50 |
| rim mounting | 96 | 99 | 104 | 103 | 98 | 97 | 95 |
| maneuverability | 115 | 123 | 102 | 100 | 124 | 128 | 131 |

In the above Tables 1 to 3, C-1 to C-6 are comparison tires, and E-1 to E-15 are tires in accordance with the present invention.

As described in the above, since tires for small passenger vehicles in accordance with the invention have a pair of mono strand bead cores of special construction, steering characteristics (maneuverability) are improved without bringing about difficulties in assembling the tire on a rim.

Also, in accordance with the invention, since the bead wire windings have larger diameter than conventional ones, the number of windings of a mono strand bead is reduced and bead breaking pressure becomes higher, and consequently it is possible to reduce tire weight and tire manufacturing cost.

While the invention has been particularly shown and described with reference to certain preferred embodiments thereof, it will be understood by those skilled in the art that various changes and modifications may be made within the spirit and scope of the invention.

I claim:

1. A pneumatic tire for small passenger vehicles, having a pair of bead portions located at the internal periphery of a pair of sidewalls connected to a tread at both the thereof, wherein in each bead portion:

(1) a bead core of the bead portion is a mono strand bead core made of rubberized circular-cross-section wire windings spirally wound and bundled, and the cross-section of the bead core is a close-packed structure unit made of 3 to 20 wire windings including a first row, a second row, and a bead base side;

(2) the diameter D of the wire is 1.2 to 2.2 mm, and the ratio H/D of the distance H between the centers of adjacent wire windings to the diameter D of the wire is 1.01 to 1.20; and (3) the cross-sectional configuration of the bead core is such that N2=N1+1, where N1 is the wire number of the first row and N2 is the wire number of the second row counted from the bead base side.

2. The pneumatic tire according to claim 1, wherein the cross-section of the bead core has a regular hexagon of close-packed structure made of 7 wire windings.

3. The pneumatic tire according to claim 1, wherein the storage modulus E' at 30° C. of the rubber between the wire windings is not less than $3.0 \times 10^8$ dyn/cm$^2$.

4. The pneumatic tire according to claim 3, wherein said storage modulus E' is not less than $1.0 \times 10^9$ dyn/cm$^2$.

5. The pneumatic tire according to claim 1, wherein said diameter D of the wires is 1.2 to 1.8 ram, and said ratio H/D is 1.05 to 1.15.

* * * * *